United States Patent [19]

Myers et al.

[11] 4,263,704

[45] Apr. 28, 1981

[54] ADJUSTABLE FILE HANDLE

[76] Inventors: Gary L. Myers, 1006 Garfield St., Tarentum, Pa. 15084; George D. Ratliff, Jr., 2314 Forest Dr., Pittsburgh, Pa. 15235

[21] Appl. No.: 19,263

[22] Filed: Mar. 9, 1979

[51] Int. Cl.³ .............................................. B23D 71/04
[52] U.S. Cl. ........................................................ 29/80
[58] Field of Search ............................ 29/76 R, 78, 80

[56] References Cited

U.S. PATENT DOCUMENTS

| 43,994 | 8/1864 | Hunter | 29/80 |
|---|---|---|---|
| 293,645 | 2/1884 | Foster | 29/80 |
| 504,553 | 9/1893 | Brooks | 29/80 |
| 1,147,204 | 7/1915 | Anheuser | 29/80 |
| 1,177,520 | 3/1916 | Hoffmann | 29/80 |
| 1,233,598 | 7/1917 | Nickum | 29/80 |
| 1,339,658 | 5/1920 | Lovell | 29/80 |
| 1,707,207 | 3/1929 | Bianchi et al. | 29/80 |
| 1,972,260 | 9/1934 | Brown | 29/80 |
| 2,127,176 | 8/1938 | Kroecker | 29/80 |
| 2,268,634 | 1/1942 | Bangerter | 29/80 |

Primary Examiner—Harrison L. Hinson
Attorney, Agent, or Firm—James O. Ray, Jr.

[57] ABSTRACT

An adjustable file handle for files is disclosed. The adjustable file handle comprises a first means which engages the sides of the file substantially adjacent its forward end and above the surface of the teeth of the file which will be in contact with a workpiece. Included with the first means is a hand gripping means for applying pressure to the forward end of the file against the workpiece in a downwardly and outwardly direction. A third means is provided which engages the sides of the tine of the file substantially adjacent the end of the tine and also above the bottom surface of the tine so that contact with a workpiece is avoided. Secured to the third means is a handle means for applying pressure to the tine end of the file against the workpiece in a downwardly and outwardly direction. Another means which is engagable with the first means which engages the forward end of the file and the third means which engages the tine end of the file for applying tension between the first means and the third means is provided.

41 Claims, 21 Drawing Figures

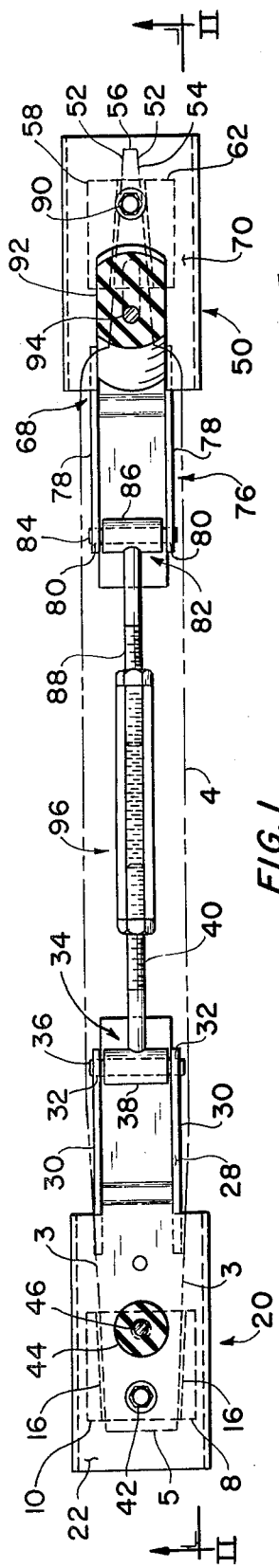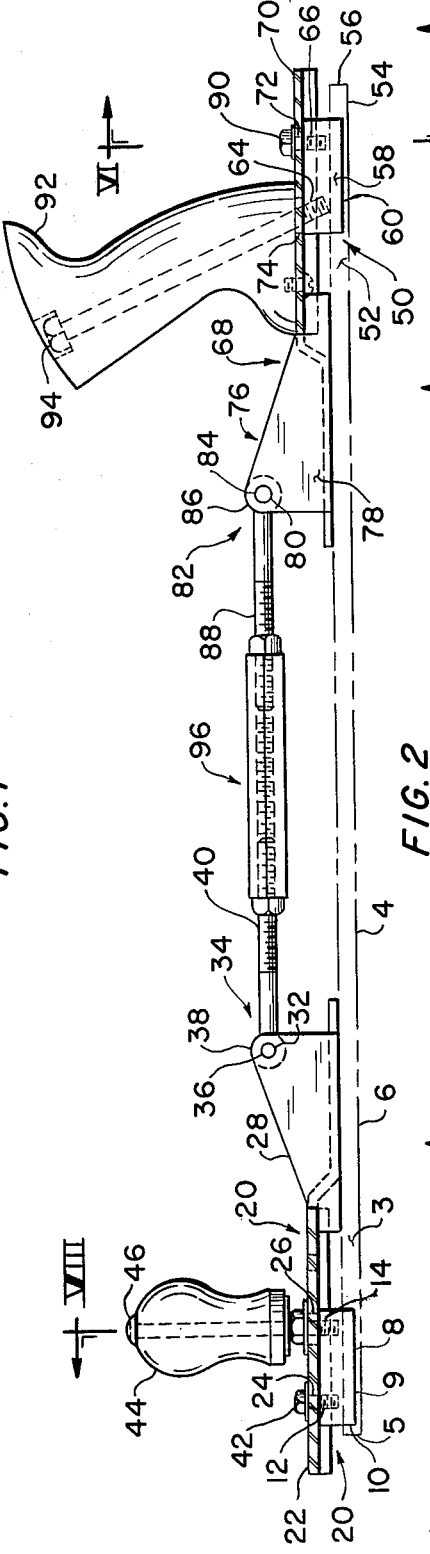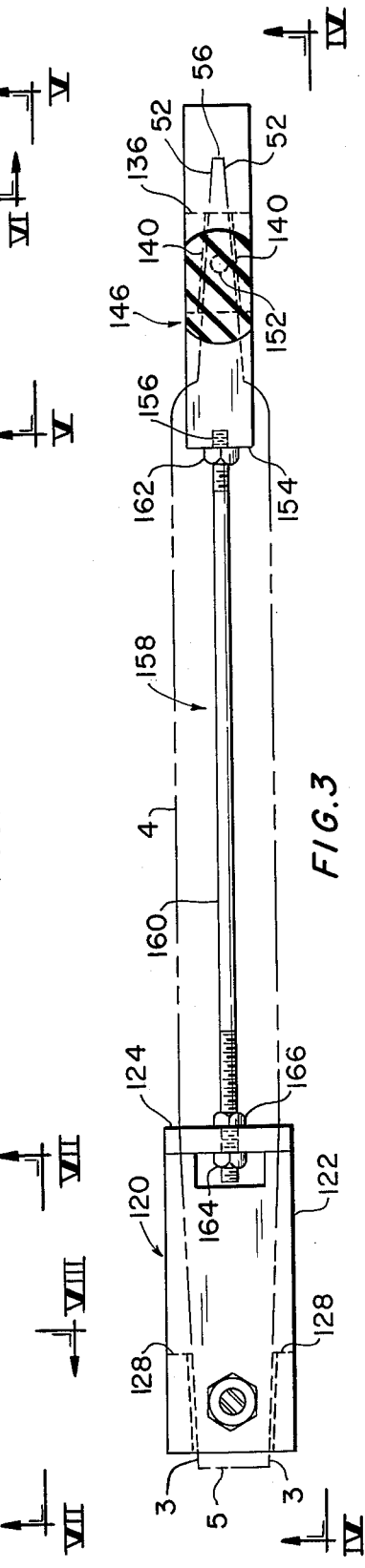

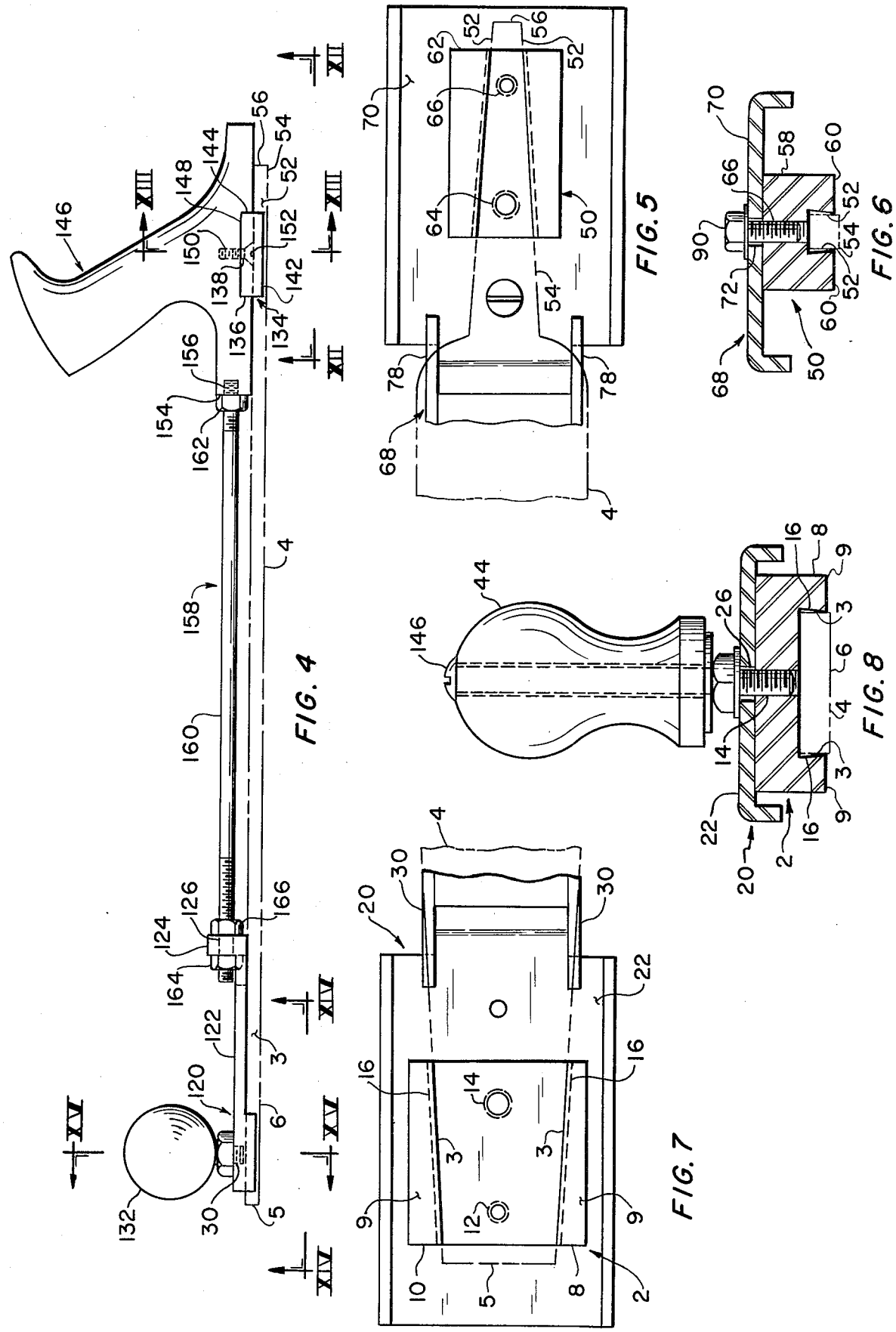

ADJUSTABLE FILE HANDLE

BACKGROUND OF THE INVENTION

This invention relates in general to custom-made tools and, more particularly, to an adjustable file handle for files which allows more uniform pressure of the file to be applied against a workpiece.

Prior to our invention most of the files sold throughout the world are not equipped with any type means for holding the file. This presents two major problems. The first and probably the major problem is safety because the hands of the person using the file must grip the sharp edges of the file teeth and the printed end of the tine. Not only are skin puncture wounds caused by this but many accidents occur from striking the fingers against the workpiece. A second significant problem is that usually uneven pressure is applied to the file against a workpiece thereby limiting the usefulness of the file where close tolerances are concerned.

Some files can be purchased which overcome a portion of the first problem because they have a handle which surrounds the tine end of the file. However, one hand must still grip the sharp teeth of the file on the opposite end. Furthermore, this type handle presents another problem not associated with a file without any handle. That is because the handle surrounds the tine end of the file there is danger of some soft material workpiece being damaged by striking of the handle against the soft workpiece. In addition, this type handle does not aid in applying a uniform pressure of the file against a workpiece. Therefore, this type handle has found little usefulness in the home workshops and because it adds to the cost of the file it has not been a great success in the marketplace.

The closest prior art we are aware of which attempts to overcome the above disadvantages of files is a tool called Trimmatool which is manufactured in England and imported into the United States. See page 140 of the January 1979 issue of Popular Science. The Trimmatool has a reversible, replaceable blade with fast-cutting curved teeth on one side and straight teeth on the other. It mounts in a frame with front and rear grips. The rear grip locks in one of two positions either vertical like the handle on a plane or parallel to the blade. In either case your hands are above the tool and out of the way when using the tool on a workpiece. However, the handle used with the Trimmatool is not adjustable and requires the special blade rather than being adaptable to most size files already found in most workshops.

BRIEF SUMMARY OF THE INVENTION

A file handle is disclosed which is adjustable to fit most common files found in home and industrial workshops. The adjustable file handle of the instant invention essentially comprises a first means that is engagable with the sides of the file substantially adjacent its forward end. The first means is secured to the file in a manner such that it will be above the teeth of the file which will be in contact with a workpiece. Also included with the first means is a hand gripping means for applying pressure to the forward end of the file against the workpiece in a downwardly and outwardly direction. A third means is provided that is engagable with the sides of the tine of the file substantially adjacent the end of the tine. Likewise the third means is secured to the tine in a manner such that it too will be above the bottom surface of the tine which can come into contact with the workpiece. Secured to the third means is a handle means which allows pressure to be applied to the tine end of the file against the workpiece in a downwardly and outwardly direction. Another means is provided which is engagable with the first means that engages the forward end of the file and the third means that engages the tine end of the file in a manner such that tension can be applied between the first means and the third means and which holds the adjustable file handle on the file.

OBJECTS OF THE INVENTION

It is therefore the primary object of our invention to provide an adjustable file handle which fits most files in home and industrial workshops.

Another object of our invention is to provide an adjustable file handle which keeps the users hands away from the file and the workpiece.

A further object of our invention is to provide an adjustable file handle which grips the file from the sides adjacent each end thereby allowing the entire length of the file to come into contact with the workpiece and prevents damage to the workpiece from being struck by the handle.

Still another object of our invention is to provide an adjustable file handle which aids the user to apply a more uniform pressure of the file against the workpiece.

A still further object of our invention is to provide an adjustable file handle which if any of the components become damaged they can be replaced without having to purchase the entire assembly.

These and various other objects and advantages of our invention will become more apparent to those skilled in the art from the following detailed description of our preferred and alternative embodiments when taken in conjunction with the attached drawings.

BRIEF DESCRIPTION OF THE DRAWINGS

FIG. 1 is a top view of our preferred adjustable file handle attached to a file.

FIG. 2 is a side view of the adjustable file handle shown in FIG. 1.

FIG. 3 is a top view of an alternative embodiment of our adjustable file handle attached to a file.

FIG. 4 is a side view of the adjustable file handle shown in FIG. 3.

FIG. 5 is a cross-sectional view taken along lines V—V of FIG. 2.

FIG. 6 is a cross-sectional view taken along lines VI—VI of FIG. 2.

FIG. 7 is a cross-sectional view taken along lines VII—VII of FIG. 2.

FIG. 8 is a cross-sectional view taken along lines VIII—VIII of FIG. 2.

BRIEF DESCRIPTION OF THE PREFERRED AND ALTERNATIVE EMBODIMENTS

Figure 9:
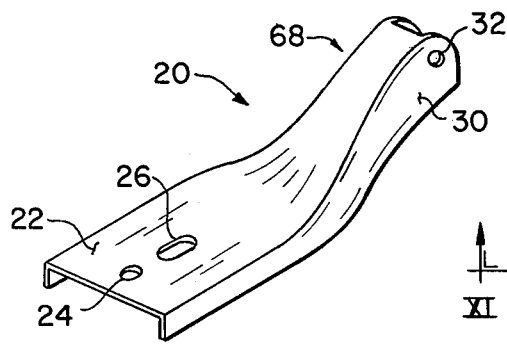
FIG. 9 is a perspective view of our preferred one piece stamped housing for use with our preferred adjustable file handle shown in FIGS. 1, 2 and 5 through 8.

Now refer more particularly to the drawings wherein like numerals indicate similar parts throughout the several views. The adjustable file handle according to the preferred embodiments of our invention comprise a first means, generally designated 2, which engages the sides 3 of the file 4 substantially adjacent the forward end 5 of file 4 and above the surface of the teeth 6 which come into intimate contact with a workpiece (not shown). The preferred means 2 for engaging the sides 3 of file 4 comprises a block 8 which has a groove in the bottom surface 9 that is tapered away from the front edge 10 which is nearest the forward end 5 of the file 4. The groove in block 8 is also tapered away from the surface 9 which is nearest the surface of the teeth 6 of file 4 and is outwardly from the sides 3 of the file 4. Block 8 has a pair of threaded holes 12 and 14 the purpose of which will be explained hereinafter. We have discovered that for best results block 8 should be made of steel which has been treated to increase the hardness thereof to between about 35 to about 40 Rockwell. For economy it is easier to treat all of block 8, however, it is only necessary for the purposes of our invention to treat the sides 16 of block 8 which will be in contact with sides 3 of file 4. Included as part of means 2 is a housing, generally designed as 20. The housing 20 is preferably a one-piece stamped-steel housing (FIG. 9) although it is obvious to those skilled in the art that the components of the housing could be of welded construction. Housing 20 comprises a flat body portion 22 which has a hole 24 and a slot 26 through the top surface thereof. The purpose of hole 24 and slot 26 will also be explained hereinafter. Housing 20 also has an upstanding portion 28 which has preferably a pair of walls 30 which have an opening 32 therein. A clevis, generally designed 34, is secured to housing 20 by a pin 36 inserted through openings 32 of housing 20 and a tubular member 38 of clevis 34. Secured to tubular member 38 of clevis 34 is a threaded rod 40. Block 8 is secured to the bottom surface of the flat body portion 20 of housing 20 by a bolt 42 which is inserted through opening 24 in housing 20 and threaded into hole 12 of block 8. A hand gripping means 44 is secured to block 8 by means of a bolt 46 which is inserted through hand gripping means 44 and slot 26 in housing 20 and then threaded into hole 14 of block 8. The hand gripping means 44 allows pressure to be applied to the forward end of the file 4 against the workpiece in a downwardly and outwardly direction. Hand gripping means 44 can obviously be of any desired shape such as a ball knob or an elongated knob which is our preferred means. Likewise, hand gripping means 44 can be of a wide variety of materials although we prefer a material selected from the group consisting of plastics, wood and aluminum.

A third means, generally designated as 50, is provided to engage the sides 52 of the tine 54 of the file 4 substantially adjacent the end 56 of the tine 54 and also above the surface of the teeth 6 of the file 4 which will be in intimate contact with a workpiece (not shown). The preferred means 50 for engaging the sides 52 of the tine 54 comprises a block 58 which has a groove in the bottom surface 60 that is tapered away from the edge 62 which will be nearest the end 56 of tine 54. The groove in block 58 is also tapered away from the surface 60 which is parallel to a plane of the surface of the teeth 6 of file 4 and is outwardly from the side 52 of the tine 54. Block 58 has a pair of threaded holes 64 and 66 the purpose of which will be hereinafter explained. As with block 8 we prefer that block 58 be made of steel which has been treated to increase its hardness to between about 35 to about 40 Rockwell at least in the area of block 58 which will be in contact with sides 52 of tine 54. A housing, generally designated as 68, is included as a part of means 50. The housing 68 is preferably a one-piece stamped steel housing although it can be of welded or bolted construction. The housing 68 has a flat body portion 70 which has a hole 72 and a slot 74 through the surface thereof. The purpose of hole 72 and slot 74 will be explained hereinafter. Housing 68 has an upstanding portion 76 which preferably has a pair of walls 78 which have an opening 80 therein. A clevis, generally designated 82, is secured to housing 68 by a pin 84 inserted through openings 80 of housing 68 and a tubular member 86 of clevis 82. Secured to tubular member 86 of clevis 82 is a threaded rod 88. Block 58 is secured to the bottom surface of the flat body portion 70 of housing 68 by a bolt 90 which is inserted through hole 72 in housing 68 and threaded into hole 66 of block 58. A handle means 92 is secured to block 58 by means of a bolt 94 which is inserted through the handle means 92 and slot 74 of housing 68 and then threaded into hole 64 of block 58. Handle means 82 allows pressure to be applied to the tine 54 end of the file in a downwardly outwardly direction against the workpiece (not shown). Handle means 92 can likewise be of any desired shape such as an elongated knob but is preferably a handle such as used on a plane. Furthermore, it is obvious to those skilled in the art that the handle means 92 can be manufactured from a wide variety of materials; however, we prefer a material selected from the group consisting of plastics, wood and aluminum.

The final necessary component of our preferred adjustable file handle is a fifth means 96 which is preferably a turnbuckle attached on one end to rod 40 and on the opposite end to rod 88 to apply tension between the first means 2 which is in engagement with the forward end of file 4 and the third means 50 which is in engagement with the tine end of file 4.

Figure 10:
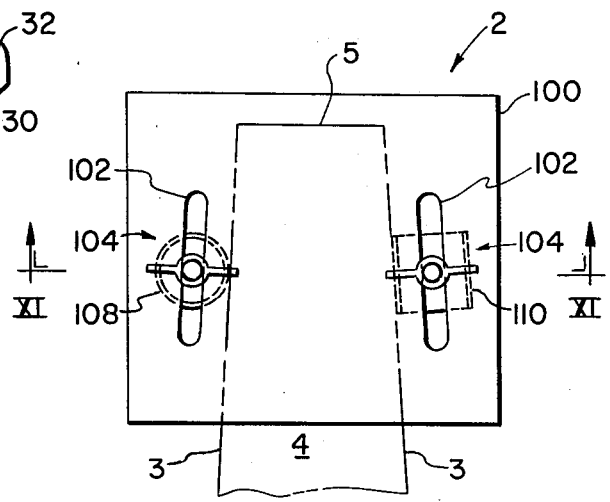
FIG. 10 is a plan view of an alternative embodiment of a means for securing our adjustable file handle to a file.
Figure 11:
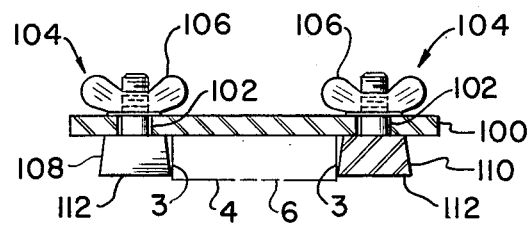
FIG. 11 is an end view of the alternative embodiment taken along lines XI—XI of FIG. 10.

Now referring to FIGS. 10 and 11 an alternative embodiment is shown for the first means 2 which engages the sides 3 of the file 4 substantially adjacent the forward end 5 of file 4 and above the surface of the teeth 6 which come into contact with a workpiece (not shown). According to this alternative we provide a base 100 which has longitudinal slots 102 which allows adjustment of a means, generally designated as 104, which is secured to the base 100 through slots 102 in any convenient manner such as by wing nuts 102. Means 104 can be in the shape of a cam 108 or as a rectangular plate 110 and are preferably steel which has been treated to a hardness of between about 35 to about 40 Rockwell. Means 104 grip the sides 3 of file 4 and are held firmly when tension is applied by means 96. In use it is desirable to have means 104 be either two cams 108 or two rectangular plates 110. Further the surfaces of cams 108 and the edges of rectangular plates 110 which will be in contact with the sides 3 of file 4 are preferably tapered away from the surface 112 which is nearest the teeth 6 of the file 4 and outwardly from the side 3 of file 4.

Another alternative embodiment of our invention is shown in FIGS. 3, 4, and 12 through 15. The adjustable file handle of our invention shown in these Figures comprises: a first means, generally designated as 120, which engages the sides 3 of file 4 substantially adjacent the forward end 5 and above the surface of the teeth 6 of the file 4 which will be in intimate contact with a workpiece (not shown). The first means 120 for engaging the sides 3 of file 4 comprises a plate 122 representing a body portion for means 120. Plate 122 has an upstanding member 124 on the end furthest from forward end 5 of file 4. Upstanding member 124 has an opening 126 the purpose of which will be explained later. On the opposite end of plate 122, or the end nearest the forward end 5 of file 4, a pair of depending legs 128 are provided to engage the sides 3 of file 4. Means 120 is preferably steel which has been treated to increase its hardness to between about 35 to about 40 Rockwell at least in the area of the depending legs 128 which will be in contact with the sides 3 of file 4. Plate 122 has a hole 130 in its top surface to allow attachment of a hand gripping means 132. The hand gripping means allows pressure to be applied to the forward end 5 of file 4 against a workpiece in a downwardly and outwardly direction. As explained supra any desired shape and a wide variety of materials are suitable for hand gripping means 132.

A third means, generally designated as 134, is provided for engaging the sides 52 of the tine 54 of the file 4 substantially adjacent the end 56 of the tine 54 and also above the surface of the teeth 6 of the file 4 which will be in contact with the workpiece. The third means 134 preferably comprises a steel insert 136 which has been treated to increase its hardness to between about 35 to about 40 Rockwell especially in the area of that which will be in contact with sides 52 of tine 54. The steel insert 136 has a hole 138 in its top surface the purpose of which will be hereinafter explained. Steel insert 136 has a groove 140 on the bottom surface 142 thereof, the groove 140 is tapered away from the edge 144 which is nearest the end 56 of the tine 54 and is also tapered away from the surface which is nearest the working surface of the file 4 and outwardly from the edge 52 of the tine 54.

A handle means, generally designated as 146, is provided which aids in applying pressure to the tine 54 end of the file 4 against a workpiece in a downwardly and outwardly direction. Handle means 146 has a groove 148 and a hole 150 located centrally in groove 148 and aligned with hole 138 of steel insert 134 so that insert 134 can be secured to handle means 146 by bolt 152. Adjacent the forward end 154 of handle means 146 is a hole 156 the purpose of which will be explained later. It should be understood by those skilled in the art that as explained heretofore the handle means 146 can be of any desired shape and made from a wide variety of materials.

The final essential element to this alternative embodiment of our instant invention is a fifth means, generally designated as 158, which is engageable with either the first means 120 or the hand gripping means 132 on the forward end 5 of the file 4 and is also engageable with either the third means 134 or the handle means 146 on the tine 54 end of the file 4. Means 158 serves to apply tension between the assembly on the forward end 5 of the file 4 and the assembly on the tine 54 end of the file 4. The means we prefer and have illustrated in the Figures comprises a rod 160 threaded on both ends. To assemble rod 160 is threaded into handle 146 hole 156 and secured by nut 162. Hole 126 of means 120 is placed around rod 160. Nut 164 is threaded on rod 160 and tightened against upstanding member 124 to apply the desired tension then nut 166 is tightened against the opposite surface of upstanding member 124 as nut 164 was tightened.

According to another alternative embodiment of the invention which is also shown in the drawings, a first means, generally designated as 168, which engages the sides 3 of the file 4 substantially adjacent its forward end 5 and also above the surface of the teeth 6 of file 4 which will be in contact with a workpiece and the hand gripping means, generally designated as 170, which allows pressure to be applied to the forward end 5 of file 4 against the workpiece in a downwardly and outwardly direction are a monolithic casting.

Likewise the third means, generally designated as 172, which engages the sides 52 of tine 54 substantially adjacent the tine 54 end 56 and above the surface of the teeth 6 of file 4 which will be in contact with a workpiece and the handle means, generally designated as 174, which allows pressure to be applied to the tine 54 end of file 4 against a workpiece in a downwardly and outwardly direction are a monolithic casting.

Further alternative means are also shown in the Figures for means which are engageable with the assembly on the forward end 5 of the file 4 and the assembly on the tine 54 end of the file 4 to apply tension therebetween. One such means comprises a rod 176 having a slip joint 178 or permanently secured 179 on one end which can be attached to either the forward end 5 assembly or to the assembly on the tine 54 end of file 4 and a threaded portion 180 on its opposite end which will be connected to the assembly opposite the slip joint 178 connection.

Figure 21:
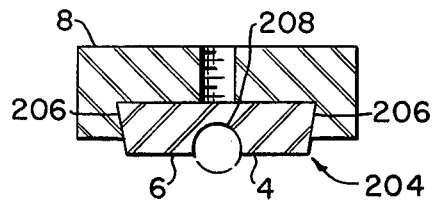
FIG. 21 shows an insert which can be used on the forward end and the tine end of our adjustable file handle so that it can be adapted for use on round files.
Figure 20:
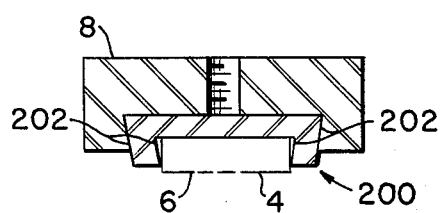
FIG. 20 shows an insert which can be used on the forward end and the tine end of a file so that the adjustable file handle can be adapted for use on small files.
Figure 18:
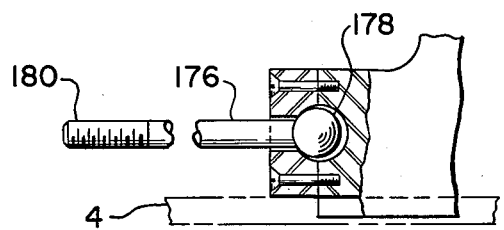
FIG. 18 shows an alternative embodiment of a means for applying tension between the forward end and the tine end of the adjustable file handle.
Figure 14:
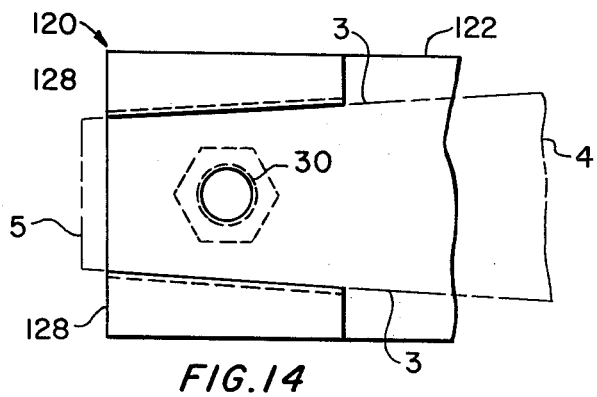
FIG. 14 is a cross-sectional view taken along lines XIV—XIV of FIG. 4.
Figure 15:
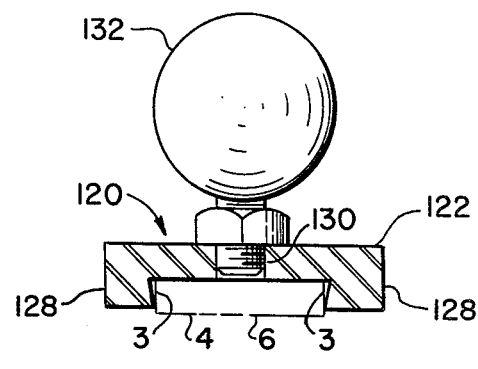
FIG. 15 is a cross-sectional view taken along lines XV—XV of FIG. 4.
Figure 12:
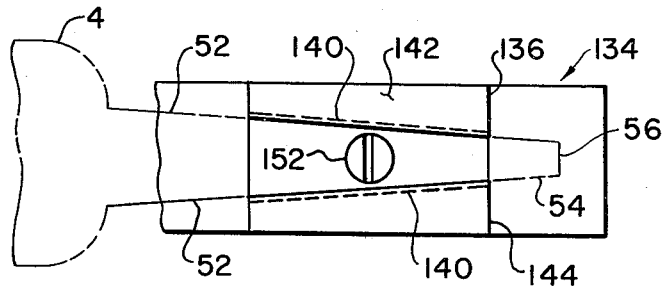
FIG. 12 is a cross-sectional view taken along lines XII—XII of FIG. 4.
Figure 13:
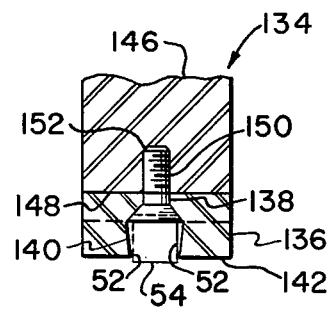
FIG. 13 is a cross-sectional view taken along lines XIII—XIII of FIG. 4.
Figure 16:
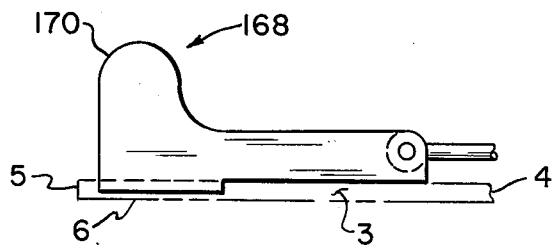
FIG. 16 shows a monolithic casting of a means for gripping the forward end of the file and a hand gripping means.
Figure 17:
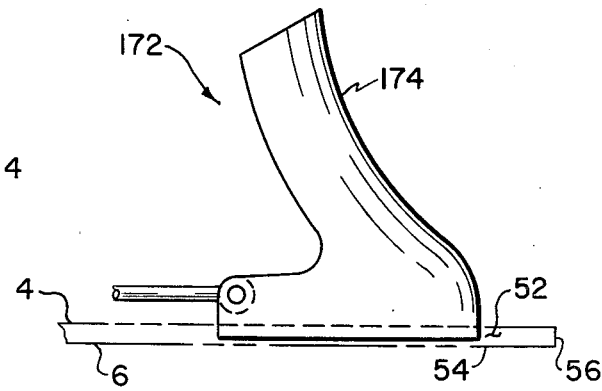
FIG. 17 shows a monolithic casting of a means for gripping the tine end of the file and a handle means.
Figure 19:
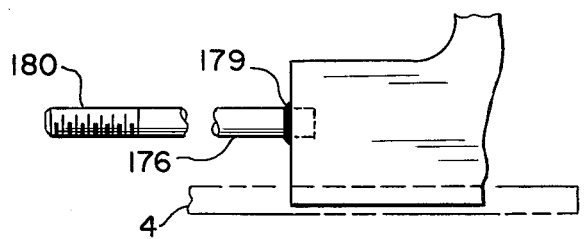
FIG. 19 shows another alternative embodiment of a means for applying tension between the forward end and the tine end of the adjustable file handle.

In order to make our adjustable file handle adaptable to various sizes and shaped files we can as shown in FIGS. 20 and 21 provide inserts for the first means and third means. For example, FIG. 20 shows an insert, generally designated as 200, which can be used for smaller files. The insert is preferably steel which has been treated to increase its hardness to a level of between about 35 to about 40 Rockwell. The insert 200 has inside and outside edges 202 which are tapered away from the edge which will be nearest the forward end and the tine end of the file and also tapered away from the surface which will be nearest the teeth of the file which contact the workpiece. An insert, generally designated 204, can also be provided for use with round files (FIG. 21). This insert 204 is also preferably steel which has been treated to a hardness of between about 35 to about 40 Rockwell. Insert 204 has outside edges 206 which are tapered away from the edge which will be nearest the forward end or the tine end of the file. Insert 204 has an inside surface 208 which is round and is tapered away from the edge which will be nearest the forward end or the tine end of the file. We prefer that inserts 200 and 204 include a coating on their outside surface to facilitate removal from the first and third means. The coating is preferably selected from the group consisting of Teflon, molybdenum disulfide, silicone, grease and mixtures thereof.

While in accordance with the patent statutes we have described our preferred and alternative embodiment it will be understood that various other modifications and adaptations may be made without departing from the spirit and scope of the appended claims.

We claim:

1. An adjustable file handle for attachment to a file having a forward end, a tine end, side surfaces and teeth for engagement with a workpiece, said adjustable file handle comprising:
   (a) a first means which includes a block having a double tapered groove to grip the file by frictional engagement substantially adjacent the forward end, said means also includes a hand gripping means secured thereto for applying pressure to the forward end of the file during working operation;
   (b) a third means which includes a block having a double tapered groove which is divergingly opposed to the double tapered groove of said block in said first means to grip the file by frictional engagement substantially adjacent the tine end, said third means also includes a handle means secured thereto for applying pressure to the tine end of the file during working operation; and
   (c) a fifth means engagable with said first means and said third means, said fifth means serving to apply tension between said first means and said third means to draw said double tapered grooves which are divergingly opposed to each other and thereby grip the file by frictional engagement without any element of said file handle obstructing the plane of the file teeth during working operation.

2. An adjustable file handle according to claim 1 wherein said hand gripping means is threadedly engaged in the upper surface of said block.

3. An adjustable file handle according to claim 2 wherein said block is secured to a housing and said hand gripping means is threadedly engaged to said block through said housing.

4. An adjustable file handle according to claim 3 wherein said housing includes a clevis for engagement with said fifth means.

5. An adjustable file handle according to claim 3 wherein said housing is a stamped one-piece housing.

6. An adjustable file handle according to claim 2 wherein said hand gripping means is an elongated knob.

7. An adjustable file handle according to claim 6 wherein said elongated knob is selected from the group consisting of plastic, wood, and aluminum.

8. An adjustable file handle according to claim 2 wherein said hand gripping means is a ball knob.

9. An adjustable file handle according to claim 1 wherein said handle means is threadedly engaged in the upper surface of said block.

10. An adjustable file handle according to claim 9 wherein said block is secured to a housing and said handle means is threadedly engaged to said block through said housing.

11. An adjustable file handle according to claim 10 wherein said housing includes a clevis for engagement with said fifth means.

12. An adjustable file handle according to claim 10 wherein said housing is a stamped one-piece housing.

13. An adjustable file handle according to claim 9 wherein said handle means is a plane handle.

14. An adjustable file handle according to claim 13 wherein said plane handle is selected from the group consisting of plastic, wood and aluminum.

15. An adjustable file handle according to claim 9 wherein said handle means is an elongated knob.

16. An adjustable file handle according to claim 1 wherein said fifth means which engages said first means and said third means to apply tension therebetween is a turnbuckle.

17. An adjustable file handle according to claim 1 wherein said first named block is hardened steel.

18. An adjustable file handle according to claim 17 wherein said block is hardened steel having a hardness of from about 35 to about 40 Rockwell.

19. An adjustable file handle according to claim 1 wherein said second named block is hardened steel.

20. An adjustable file handle according to claim 19 wherein said block is hardened steel having a hardness of from about 35 to about 40 Rockwell.

21. An adjustable file handle according to claim 1 wherein said first means includes a base having a longitudinal slot which allows adjustment of said block which is secured to said base through said slot for engaging the sides of said file substantially adjacent its forward end.

22. An adjustable file handle according to claim 21 wherein said block secured to said base is a cam.

23. An adjustable file handle according to claim 21 wherein said block secured to said base is a rectangular plate.

24. An adjustable file handle for attachment to a file having a forward end, a tine end, side surfaces and teeth for engagement with a workpiece, said adjustable file handle comprising:
   (a) a first means which includes a member having a double tapered groove to grip the file by frictional engagement substantially adjacent the forward end;
   (b) a hand gripping means engagable with said first means, said hand gripping means allowing pressure to be applied to the forward end of the file during working operation;
   (c) a third means which includes a member having a double tapered groove, which is divergingly opposed to the double tapered groove of said member in said first means, to grip the file by frictional engagement substantially adjacent the tine end;
   (d) a handle means engagable with said third means, said handle means allowing pressure to be applied to the tine end of the file during working operation; and
   (e) a tensioning means to draw the double tapered grooves of said first named member and the double tapered grooves of said second named member which are divergingly opposed to each other and thereby grip the file by frictional engagement without any element of said file handle obstructing the plane of the file teeth during working operation.

25. An adjustable file handle according to claim 26 wherein said first means is a plate having an upstanding member on one end for engagement by said tensioning means and a pair of depending legs which form said first named member for engaging the sides of the file.

26. An adjustable file handle according to claim 25 wherein said pair of depending legs are steel treated to increase their hardness.

27. An adjustable file handle according to claim 26 wherein said pair of depending legs are treated to a hardness of between about 35 to about 40 Rockwell.

28. An adjustable file handle according to claim 24 wherein said third means for engaging the sides of the tine is a steel insert adapted for attachment to said handle means and having a groove on the bottom surface thereof, said groove being tapered away from the edge which will be nearest the end of the tine and is also tapered away from the surface which is nearest the working surface of the file and outwardly from the edge of the tine.

29. An adjustable file handle according to claim 28 wherein said steel insert is treated to increase its hardness at least in the area which will be in contact with the tine.

30. An adjustable file handle according to claim 29 wherein said hardness is between about 35 to about 40 Rockwell.

31. An adjustable file handle according to claim 24 wherein tensioning means is a rod threaded on at least one of its ends for engaging said first and said third means to apply tension therebetween.

32. An adjustable file handle according to claim 24 wherein said first means and said hand gripping means are a monolithic casting.

33. An adjustable file handle according to claim 24 wherein said third means and said handle means are a monolithic casting.

34. An adjustable file handle according to claim 24 wherein said tensioning means is a rod having a slip joint on one end attached to one of said first means or said hand gripping means on one end or to one of said third means or said handle means on the other end and said rod having a threaded portion on the other end for attachment to the other end of one of said first means or said hand gripping means or to one of said third means or said handle means.

35. An adjustable file handle according to claim 24 wherein said tensioning means is a rod secured to one of said first means or said hand gripping means on one end or to one of said third means or said handle means on the other end and said rod having a threaded portion on the other end for attachment to the other end of said first means or said hand gripping means or to one of said third means or said handle means.

36. An adjustable file handle according to claim 24 further including an insert for use with said first means and said third means so that said adjustable file handle can be used with smaller files, said insert having inside and outside edges which are tapered away from the edge which will be nearest the forward end or the tine end of the file and is also tapered away from the surface which is nearest the working surface of the file.

37. An adjustable file handle according to claim 36 wherein said insert is steel which has been hardened to between about 35 to about 40 Rockwell.

38. An adjustable file handle according to claim 37 wherein said insert further includes a coating on its outside to facilitate removal from said first means and said third means after use.

39. An adjustable file handle according to claim 38 wherein said coating is selected from the group consisting of Teflon, molybdenum disulfide, silicone, grease, graphite, and mixtures thereof.

40. An adjustable file handle according to claim 24 further including an insert for use with said first means and said third means so that said adjustable file handle can be used with round files, said insert having outside edges which are tapered away from the edge which will be nearest the forward end or the tine end of the file and said insert having an inside surface which is round and likewise tapered away from the edge which will be nearest the forward end or the tine end of the file.

41. An adjustable file handle according to claim 40 wherein said insert is steel which has been hardened to a hardness of between about 35 to about 40 Rockwell.

* * * * *